United States Patent
Gottschalk

(10) Patent No.: US 7,530,583 B2
(45) Date of Patent: May 12, 2009

(54) ADJUSTABLE BOSS FOR STEERING KNUCKLE AND METHOD OF INSTALLING SAME

(75) Inventor: Michael J. Gottschalk, Granville, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 217 days.

(21) Appl. No.: 11/147,190

(22) Filed: Jun. 7, 2005

(65) Prior Publication Data

US 2005/0242540 A1 Nov. 3, 2005

Related U.S. Application Data

(63) Continuation-in-part of application No. 10/356,636, filed on Feb. 3, 2003, now Pat. No. 6,902,176.

(51) Int. Cl.
*B62D 7/18* (2006.01)

(52) U.S. Cl. ............... 280/93.512; 29/898.09

(58) Field of Classification Search ............ 280/93.512, 280/93.511, 86.75; 384/262; 29/898.09, 29/447, 446
See application file for complete search history.

(56) References Cited

U.S. PATENT DOCUMENTS

| | | | |
|---|---|---|---|
| 1,438,214 A | 12/1922 | Brady et al. | |
| 1,932,340 A | 10/1933 | Goltry | |
| 1,946,738 A | 2/1934 | Gulan et al. | |
| 2,076,852 A | 4/1937 | Leighton | |
| 2,094,945 A | 10/1937 | Hesselrode | |
| 2,187,249 A | 1/1940 | Schatz | |
| 2,311,125 A | 2/1943 | Phelps | |
| 2,428,651 A | 10/1947 | Buese | |
| 2,512,881 A | 6/1950 | Smiley | |
| 3,852,872 A * | 12/1974 | Afanador et al. | ............... 29/447 |
| 3,981,513 A * | 9/1976 | Erskine | ................. 280/93.512 |
| 4,007,894 A | 2/1977 | Hartel | |
| 4,229,017 A * | 10/1980 | Hagedorn | ............... 280/93.512 |
| 4,252,338 A | 2/1981 | Inglass et al. | |
| 4,286,799 A * | 9/1981 | Ayres | ................... 280/93.512 |
| 4,635,952 A * | 1/1987 | Smith | ................... 280/93.512 |
| 4,690,418 A * | 9/1987 | Smith | ................... 280/93.512 |
| 4,728,088 A | 3/1988 | Smith | |
| 4,798,394 A | 1/1989 | Pollock et al. | |
| 5,709,399 A * | 1/1998 | Smith, Jr. | ................ 280/93.512 |

(Continued)

OTHER PUBLICATIONS

EPO Search Report, Jun. 14, 2004.

*Primary Examiner*—Eric Culbreth
*Assistant Examiner*—George D. Spisich
(74) *Attorney, Agent, or Firm*—Pequignot + Myers LLC; Matthew A. Pequignot

(57) ABSTRACT

A multi-piece steering knuckle having at least one boss which is adjustable in position along an axis of a king pin. More particularly, a steering knuckle including at least one boss which can be assembled, employing unique methodology, to minimize space tolerances between the steering knuckle boss and an axle. In preferred embodiments, a steering knuckle boss which can be installed by press-fit methods to be selectively positioned in a desired position along an axis of a king pin in a non-finite number of incremental positions. In another embodiment, a steering knuckle boss having, optionally, an inner wall composed of, at least in part, a nickel-aluminum bronze alloy.

35 Claims, 14 Drawing Sheets

U.S. PATENT DOCUMENTS

| | | | |
|---|---|---|---|
| 5,722,784 A * | 3/1998 | Link | 403/158 |
| 5,749,594 A | 5/1998 | Krisher | |
| 5,975,547 A * | 11/1999 | Stroh et al. | 280/93.512 |
| 6,113,118 A | 9/2000 | Zebolsky | |
| 6,116,626 A | 9/2000 | Cherry et al. | |
| 6,367,825 B1 | 4/2002 | Kilpatrick | |
| 6,398,240 B1 | 6/2002 | Taylor | |
| 6,485,109 B2 * | 11/2002 | Brinker et al. | 301/105.1 |
| 6,616,156 B1 | 9/2003 | Dudding et al. | |
| 2004/0227319 A1 * | 11/2004 | Varela et al. | 280/93.512 |
| 2004/0232641 A1 * | 11/2004 | Kaiser | 280/93.512 |

* cited by examiner

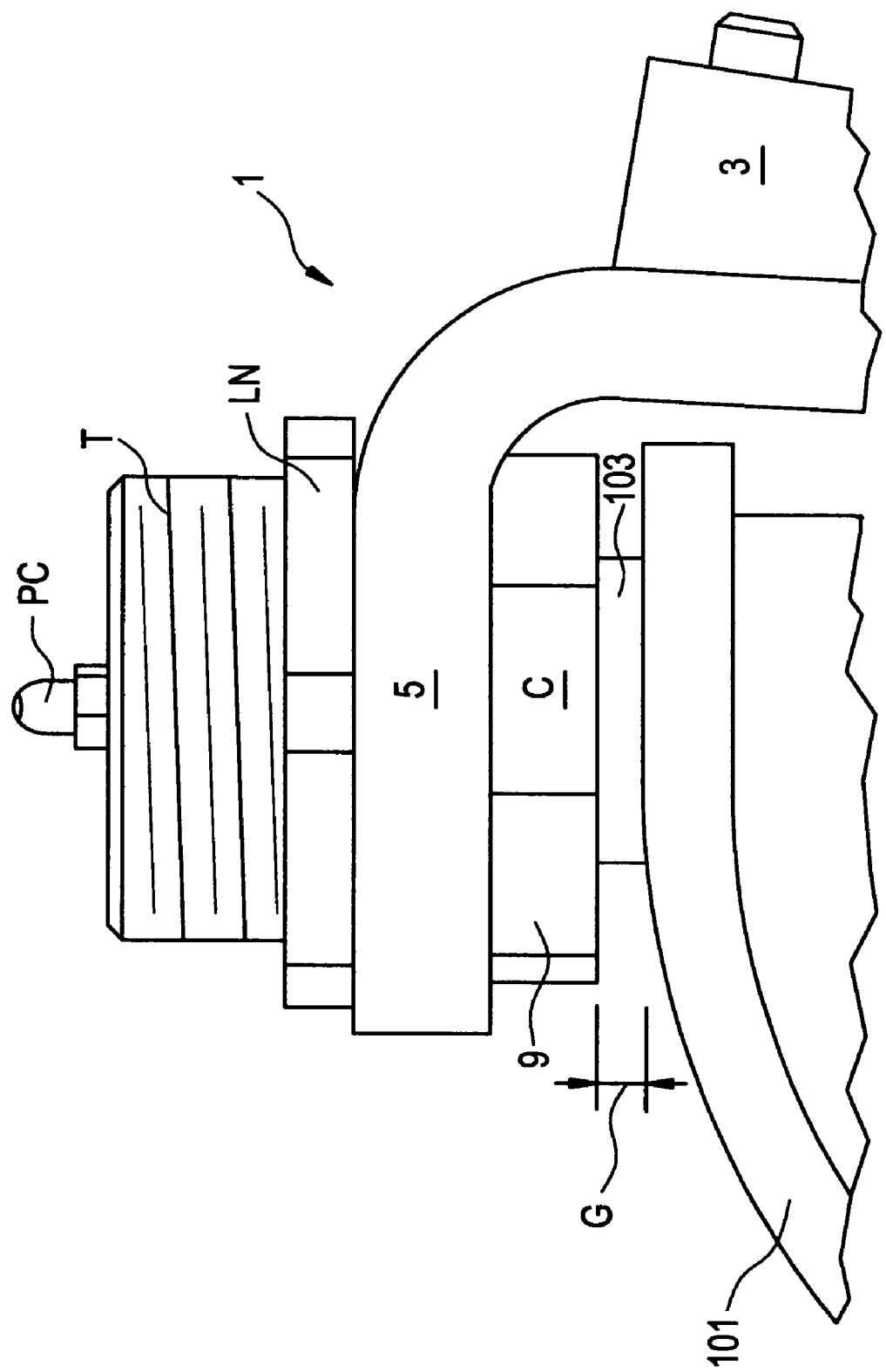

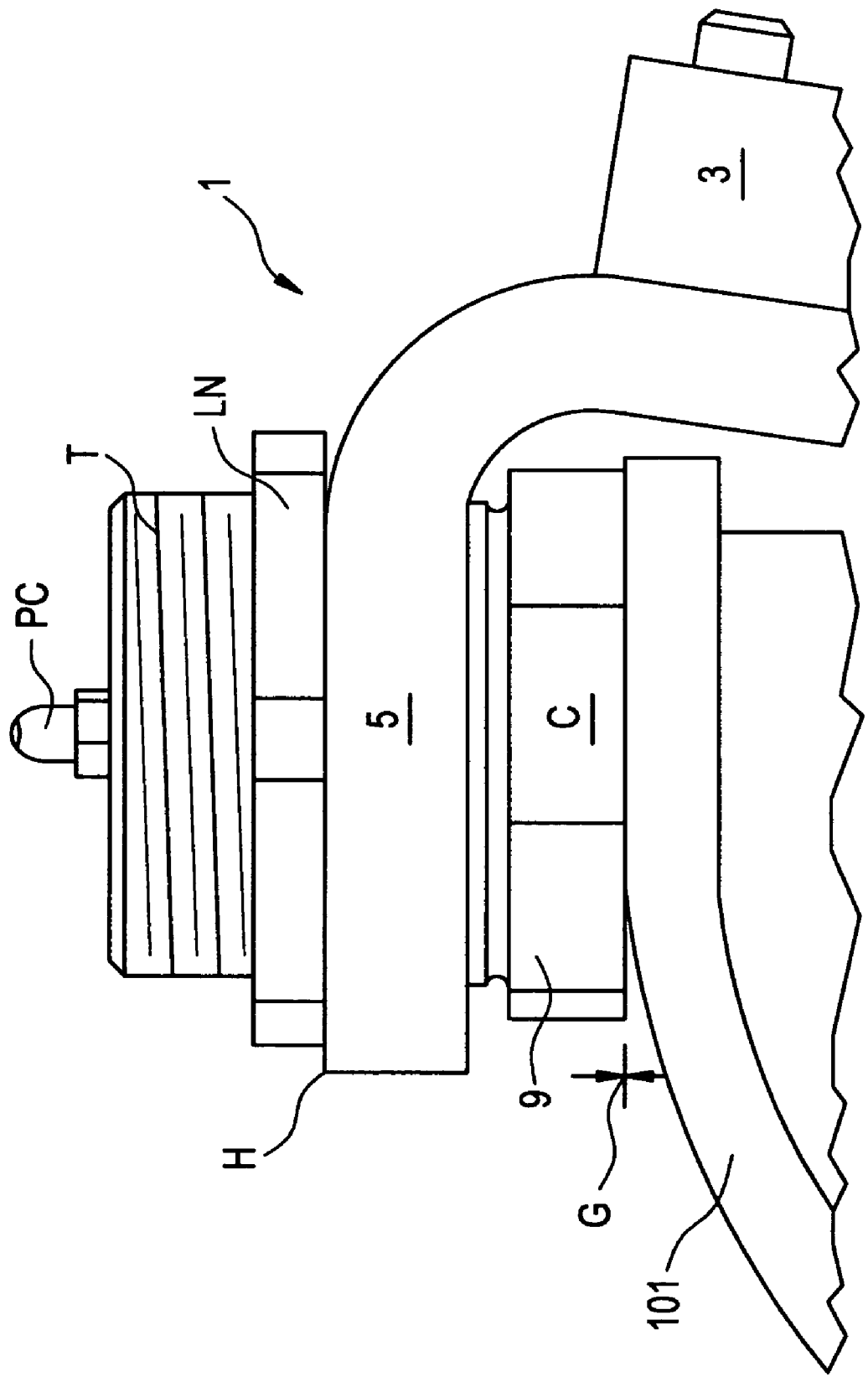

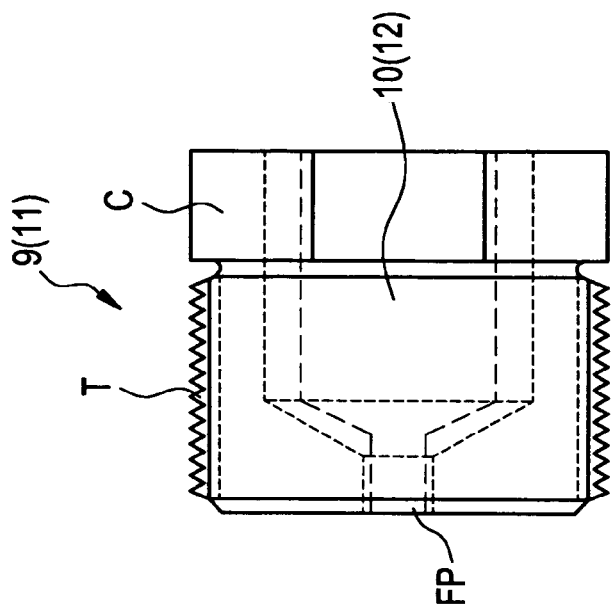
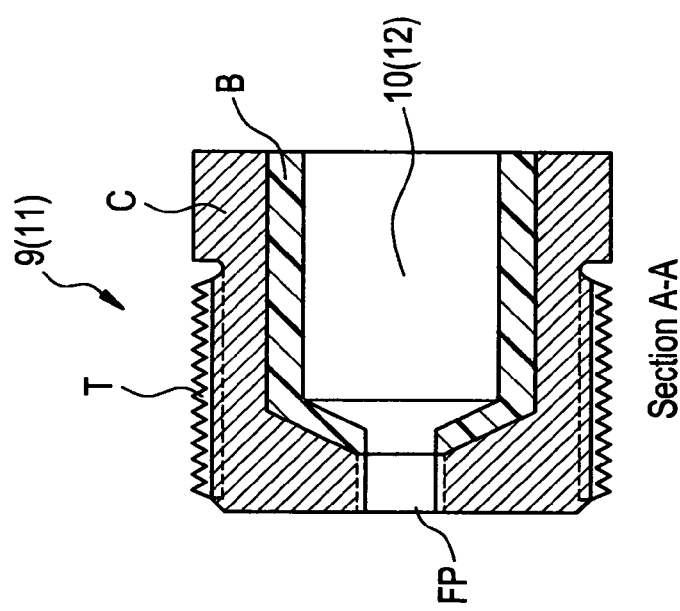
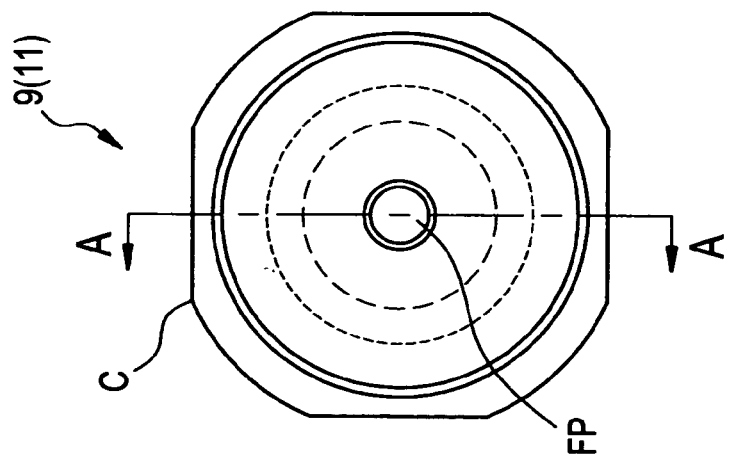

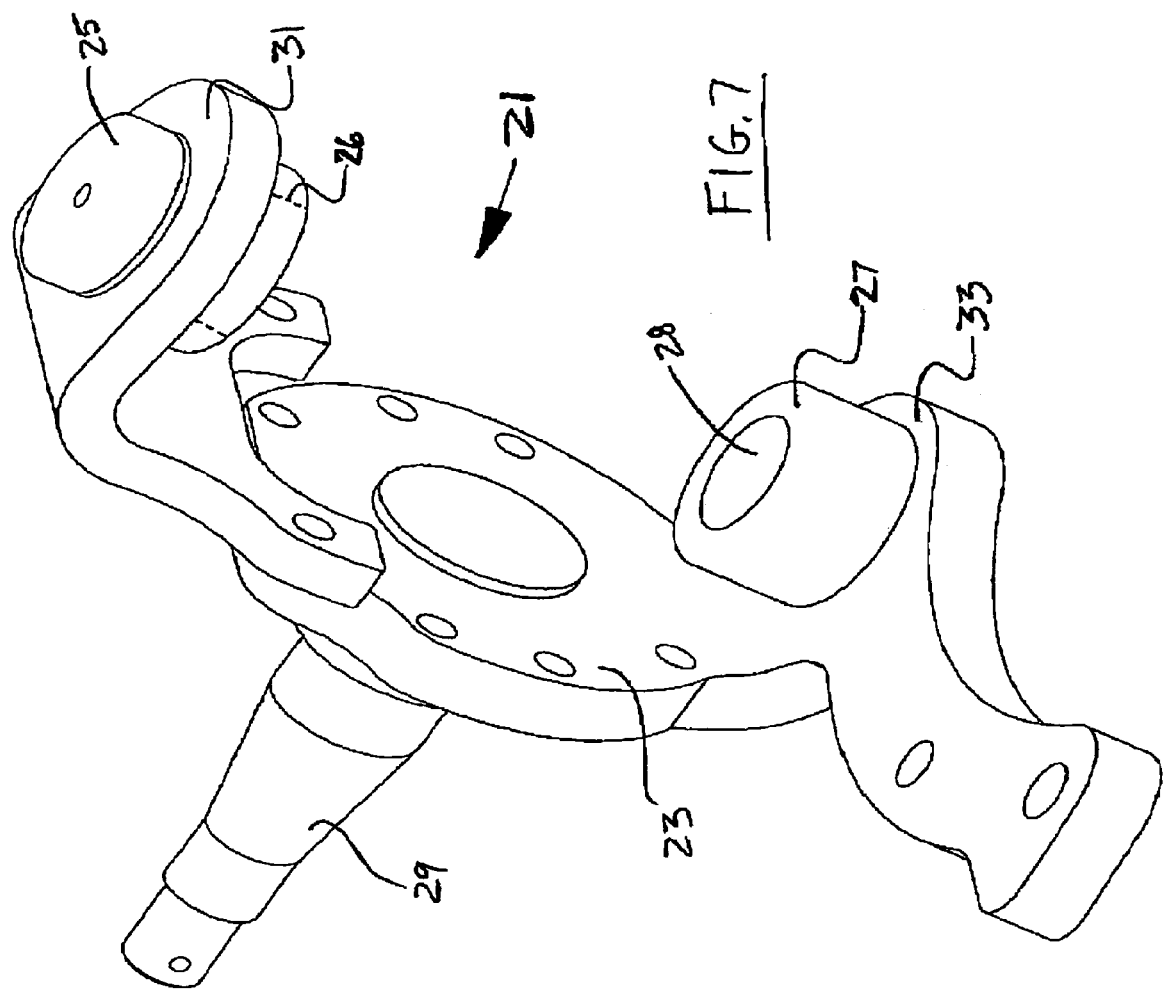

ADJUSTABLE BOSS FOR STEERING KNUCKLE AND METHOD OF INSTALLING SAME

RELATED APPLICATION DATA

This application is a continuation-in-part of U.S. patent application Ser. No. 10/356,636, filed Feb. 3, 2003, now U.S. Pat. No. 6,902,176 entitled STEERING KNUCKLE AND ADJUSTABLE BOSS, and, as such, claims priority thereof. The entirety of application Ser. No. 10/356,636 is hereby incorporated by reference.

FIELD OF INVENTION

This invention relates to steering assemblies for wheeled vehicles. In particular, this invention relates to such assemblies which may be provided with upper and lower yoke arms and at least one boss which is adjustable in position along an axis of an axle kingpin. In other embodiments, this invention relates to a method of installing such steering assemblies to minimize space tolerances between the steering knuckle boss and an axle.

BACKGROUND OF INVENTION

The use of steering knuckles for carrying wheel assemblies is a long established practice for providing steerability to vehicle axles. As such, in addition to their use on various automobiles, steering knuckles are employed on a large number of light and heavy duty commercial trucks in use today, and are utilized with both permanent (fixed) and auxiliary, lift-type axles.

Steering knuckles of the known-type are generally constructed of upper and lower yoke arms carrying rigidly (e.g., immovably) mounted upper and lower bosses (each having an aperture for receipt of a kingpin), as well as a main body (joining the two yoke arms) having an integrated or press fit spindle extending centrally therefrom for mounting a wheel assembly thereon. In conventional steerable axle construction, the beam of the axle normally includes a kingpin mounted at each end thereof in a generally vertical orientation for assembly of a steering knuckle thereto. When assembled, the steering knuckle is positioned so that the kingpin ends ride in the apertures of the upper and lower bosses so that the knuckle can rotate back and forth about the axis of the kingpin to provide steerability. Although steering knuckles are widely used in the automotive arts, various drawbacks related to known knuckle designs as well as known methods of assembling such designs to axles have been discovered (e.g., principally related to component wear rates).

Specifically, in one example, because a kingpin is typically press-fit into an axle prior to assembly of a steering knuckle thereon, and because in conventional steering knuckle design, a knuckle is normally of one-piece construction, there is substantial skill required to assemble such a steering knuckle to a "kingpinned" axle (an axle having a kingpin pre-installed). Furthermore, maintenance or repair of a conventionally installed steering knuckle assembly of known type is difficult because of the complications inherent in removing a one-piece steering knuckle from a fixed kingpin. Moreover, because of differences in manufacturing tolerances as well as differences in axle and kingpin designs (which may, for example, come from different manufacturers), the initial "fit" of a steering knuckle on a individual axle is often imperfect and adjustments are, therefore, typically made to improve the installed fit in order to improve performance and/or wear characteristics.

For example, in a conventional steering knuckle and kingpin assembly, if there is a space between the bosses of the steering knuckle and the kingpin seating area of the axle (the area of the axle surrounding the kingpin), thus leaving a gap between the axle and the boss such as gap "G" in FIG. 4b, unwanted movement of the knuckle on the kingpin occurs during vehicle operation. More specifically, when such a gap between the knuckle bosses and the axle exists after assembly, the kingpin will, in effect, oscillate within the apertures of the bosses when a vehicle employing the axle is operated (due to movement of the knuckle relative to the kingpin, for example). This oscillation (i.e., a axial movement of the kingpin in and out of the boss apertures), in turn, creates alternating high and low pressure pockets within the boss apertures. As a result, a vacuum in the apertures is created which sucks dirt or other debris into the bosses, thereby causing wear to the kingpin as well as to the bearing and/or bushing surfaces located within the apertures of the bosses.

Several prior art attempts have been made to solve the above described problems associated with the failure to acceptably seat the steering knuckles and contacting parts in steerable axles, particularly in heavy duty vehicles such as trucks and trailers. One known prior art technique for addressing this problem involves eliminating undesired gaps in steering knuckle/axle assemblies by manually adding shims over the kingpin during knuckle installation. The shims which are added effectively eliminate unwanted space between the bosses and the kingpin seating area. As will be recognized, this prior art method of tailoring steering knuckle fit requires additional labor and parts, and further relies on a trial and error approach when attempting to, hopefully, end up with the appropriate/ideal distance between bosses and the axle (i.e., the assembler must guess at the correct number of shims which must be added to eliminate the "gap" and then adjust the number after a trial fit, if necessary).

More recent attempts to solve the above described and other problems in the steerable axle arts have involved the use of multi-piece knuckles employing bolt-on yokes or bosses such as exemplified by U.S. Pat. No. 6,367,825 (hereinafter the '825 patent). Nevertheless, although the '825 patent generally addresses the problem described herein, the range of adjustability which is achieved by the mechanism described in the '825 patent is finite (limited) because adjustment of the knuckle is restricted to the increments dictated by the size of the teeth of the boss and knuckle (flange) mating portions. More specifically, the boss can only be adjusted a distance which is a factor of the size of the mating teeth of the respective knuckle parts.

It is, of course, desirable to have the capability to adjust the position of a boss in a greater number of increments (e.g., a non-finite number) so as to create a more precise "fit" when assembling a steering knuckle to an axle. In short, such improved adjustability would provide the capability for more precisely fine tuning the fit of a steering knuckle on a steerable axle. This, in turn, would reduce part wear rates and decrease labor costs associated with axle assembly.

In view of the above, it is apparent that there exists a need in the art for methods and/or apparatus which overcome or, at least, ameliorate the above drawbacks. It is a purpose of this invention to fulfill this need, as well as other needs in the art which will become apparent to the skilled artisan once given the above disclosure.

SUMMARY OF INVENTION

Generally speaking, this invention fulfills the above-described needs in the art by providing:

a method of assembling a steering knuckle to a steerable axle, the steerable axle having an axle beam and a kingpin mounted in an end thereof, the method comprising:

assembling a lower yoke arm of a steering knuckle to a first end of the kingpin so that a lower kingpin housing connected to the lower yoke arm is in receipt of at least a portion of the first end of the kingpin;

assembling an upper yoke arm of the steering knuckle to a second end of the kingpin so that an upper kingpin housing associated with the upper yoke arm is in receipt of at least a portion of the second end of the kingpin; and press fitting the upper kingpin housing into an aperture of the upper yoke arm so that the upper kingpin housing is immovably connected to the upper yoke arm and so that non-functional gaps between the upper kingpin housing and an area of the axle beam surrounding the second end of the kingpin are substantially eliminated.

In another embodiment, this invention provides:

apparatus comprising:

a steerable axle having an axle beam, the axle beam having a top surface and a bottom surface, a kingpin mounted in an end of the axle beam such that a first end of the kingpin extends generally upwardly from the top surface of the axle and such that a second end of the kingpin extends generally downwardly from the bottom surface of the axle; and a steering knuckle steerably connected to the steerable axle, the steering knuckle comprising:

a first yoke arm having a first boss associated therewith, the first boss having an aperture in receipt of the first end of the kingpin;

a second yoke arm having a second boss associated therewith, the second boss having an aperture in receipt of the second end of the kingpin;

a knuckle body to which the first and the second yoke arms are connected, the knuckle body having a spindle extending outwardly therefrom for carrying a vehicle wheel; and wherein at least one of the first boss and the second boss is press fit to a respective yoke arm such that non-functional gaps between the first boss and the top surface of the axle and between the second boss and the bottom surface of the axle are substantially eliminated.

In certain embodiments, the first and second yoke arms are integrally formed with the knuckle body.

In a still further embodiment, this invention provides:

a method of assembling a steering knuckle to a steerable axle, the steerable axle having an axle beam and a kingpin mounted in an end thereof, the method comprising:

assembling a first boss of a first yoke arm to a first end of the kingpin;

assembling a second boss of a second yoke arm to a second end of the kingpin at an initial location;

axially adjusting the position of the second boss along a longitudinal axis of the kingpin from the initial location to a fixed location, the fixed location being selected so that substantial gaps between the first boss and an area of the axle beam surrounding the first end of the kingpin and between the second boss and an area of the axle beam surrounding the second end of the kingpin are substantially eliminated; the adjustment of the position of the second boss being performed in a method step wherein the second boss is press fit into an aperture of the second yoke arm so that the second boss is immovably installed in the aperture of the second yoke arm via interference fit.

In yet a further embodiment, this invention provides:

a method of assembling a steering knuckle to a steerable axle having a kingpin, the steering knuckle comprising:

a knuckle body having a spindle extending therefrom for assembly of a wheel thereto;

an upper yoke arm having a first boss associated therewith, the first boss including a first aperture for receiving a first end of the kingpin;

a lower yoke arm having a second boss associated therewith, the second boss including a second aperture for receiving a second end of the kingpin;

at least one of the upper and lower yoke arms and its respective boss associated therewith including matable friction fit connection surfaces for connecting the at least one yoke arm to its associated boss via interference fit, and further wherein the boss is immovably connectable to its the associated yoke arm in a plurality of axial positions selectable to tailor fit the boss to the kingpin of the steerable axle to prevent substantial movement of the kingpin axially within the first and the second apertures while simultaneously permitting rotational movement of the kingpin within the first and the second apertures;

wherein the method comprises:

assembling the upper yoke arm and the first boss on the kingpin of the steerable axle such that the first aperture of the first boss is in receipt of at least a portion of the first end of the kingpin;

assembling the lower yoke arm and the second boss on the kingpin of the steerable axle such that the second aperture of the second boss is in receipt of at least a portion of the second end of the kingpin;

press fitting at least one of the first boss or the second boss into a yoke aperture of the upper or the lower yoke arm so that any substantial non-functional gaps between the first boss and an area of the steerable axle surrounding the first end of the kingpin and between the second boss and an area of the steerable axle surrounding the second end of the kingpin are eliminated.

In certain preferred embodiments, the degree of adjustability is sufficient to substantially completely eliminate any gap or gaps between the boss and the axle (e.g., non-functional gaps).

IN THE DRAWINGS

FIG. 4B is a partial, profile view of the yoke arm and boss of the steering knuckle illustrated in FIG. 4A shown illustrating a typical and undesirable gap "G" prior to its elimination by adjustment of at least one boss in accordance with this invention.

FIG. 4C is a partial, profile view of the yoke arm and boss of the steering knuckle according to FIG. 4A illustrating more fully the substantial elimination of gap "G".

FIG. 6A is a side, x-ray view of an adjustable boss according to one embodiment of the subject invention.

FIG. 6B is a side sectional view of the embodiment of the adjustable boss illustrated in FIG. 6A.

FIG. 6C is an end, x-ray view of the embodiment of the adjustable boss illustrated in FIG. 6B.

FIG. 7 is a three-dimensional view of an alternative embodiment of an adjustable steering knuckle according to the subject invention.

DETAILED DESCRIPTION OF CERTAIN EMBODIMENTS

Figure 1:
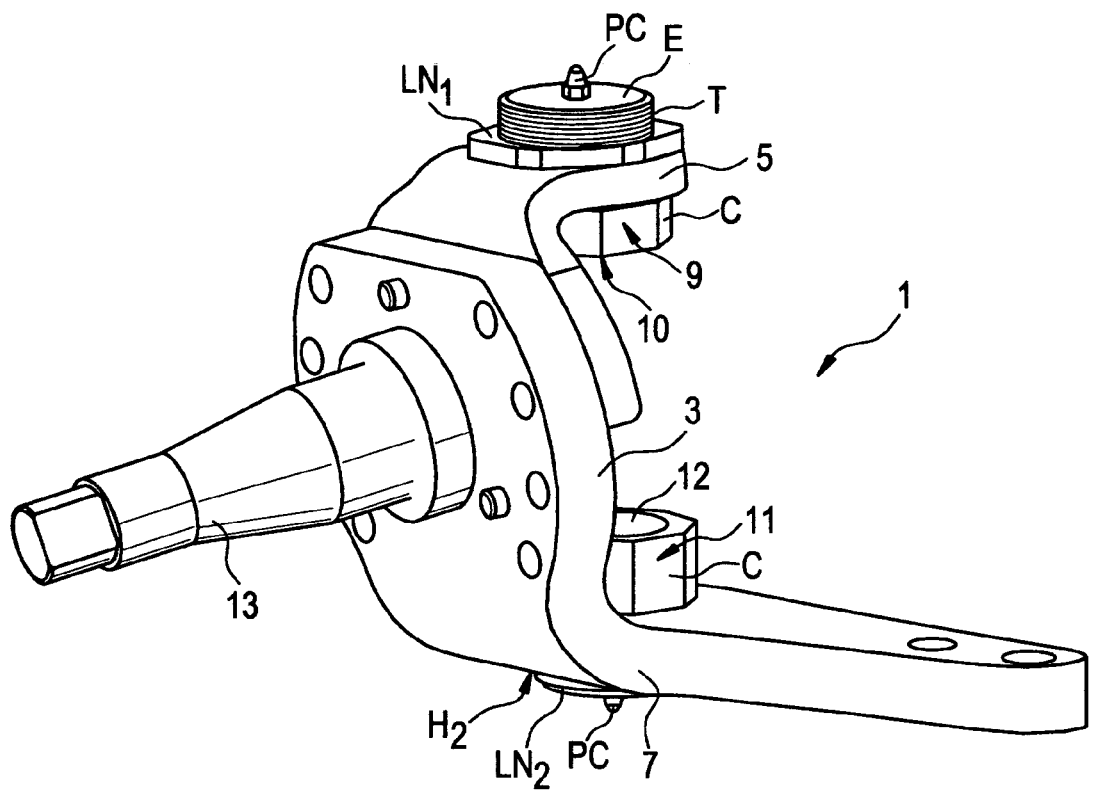
FIG. 1 is a three-dimensional view of one embodiment of a steering knuckle according to the subject invention.
Figure 2:
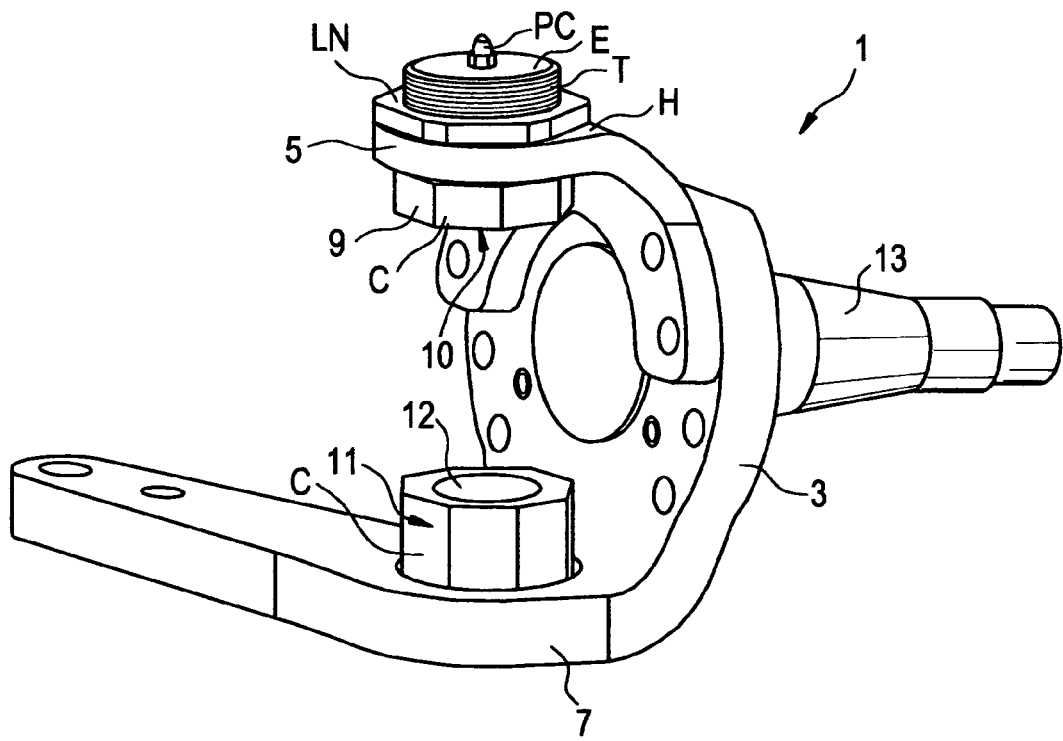
FIG. 2 is a second three-dimensional view of the embodiment illustrated in FIG. 1.
Figure 3:
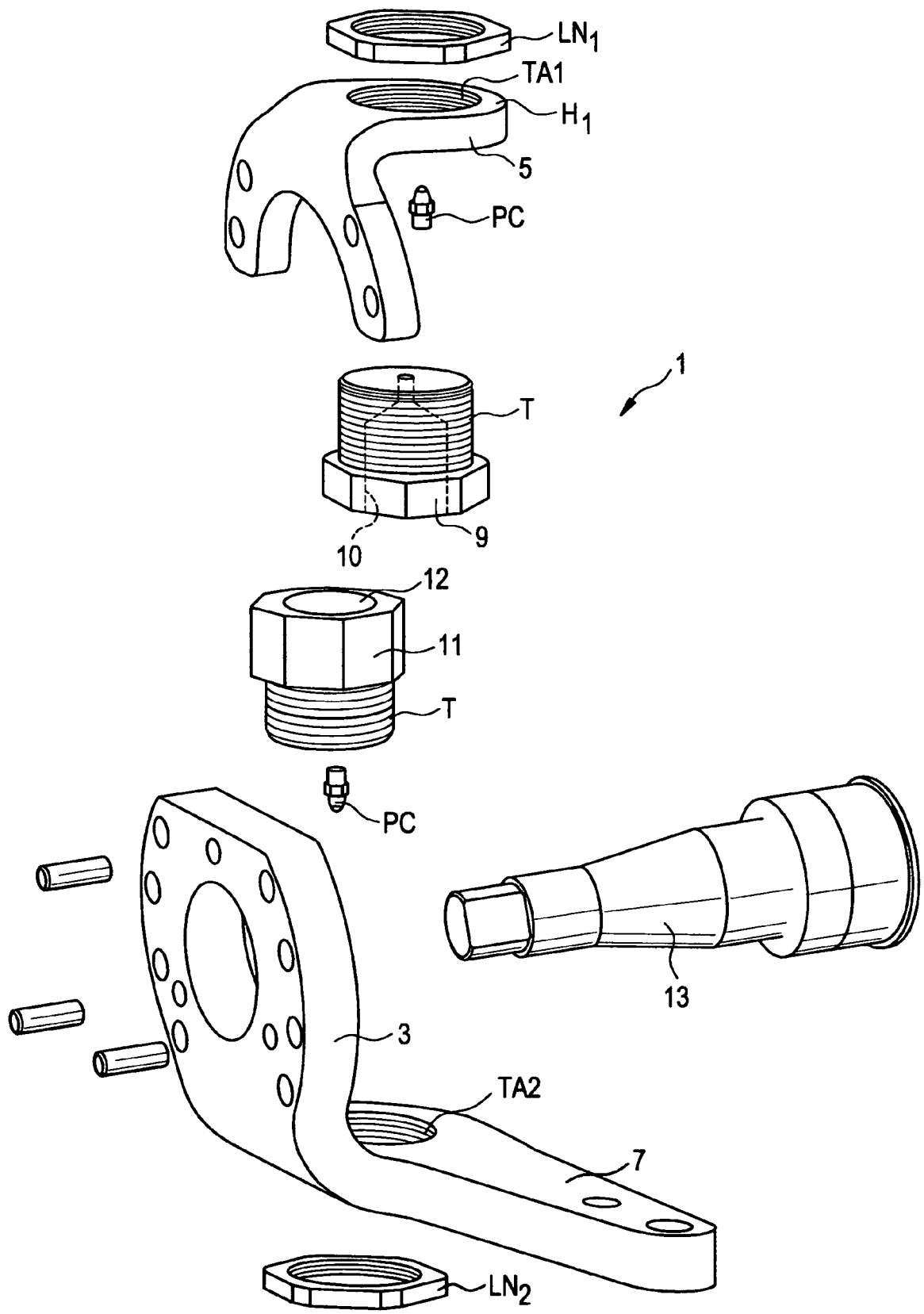
FIG. 3 is a three-dimensional exploded view of the embodiment of the steering knuckle illustrated in FIG. 1.

Referring now initially to FIGS. 1-3 an exemplar steering knuckle according to one embodiment of the subject invention is illustrated therein. As illustrated, steering knuckle 1 generally comprises a main knuckle body 3 having upper and lower yoke arms 5 and 7 connected thereto, respectively, and spindle 13 extending centrally therefrom for mounting a wheel assembly thereon. As may be seen most clearly in FIG. 3, steering knuckle 1, in this embodiment, is a fabricated knuckle constructed of multiple forged, cast, and/or machined parts. Moreover, in this embodiment, upper yoke arm 5 is a bolt-on part and may be removed or attached selectively as needed for the more simplified installation and removal of steering knuckle 1 from an axle mounted kingpin. Alternatively, in other known embodiments, yolk arm 5 may be formed integrally with main body 3, or, both yolk arms 5 and 7 may be fabricated, removable (e.g., bolt-on) parts (or both may likewise be integrated with body 3). Similarly, spindle 13 may be fabricated and press fit into main body 3 or, in the alternative, spindle 13 may be machined or forged as an integral part thereof. Selection of the specific embodiment or configuration which is employed, in this regard, may be made based on cost and/or weight considerations, for example, or by specific customer request, with various advantages of certain embodiments being discussed in more detail below.

Figure 4A:
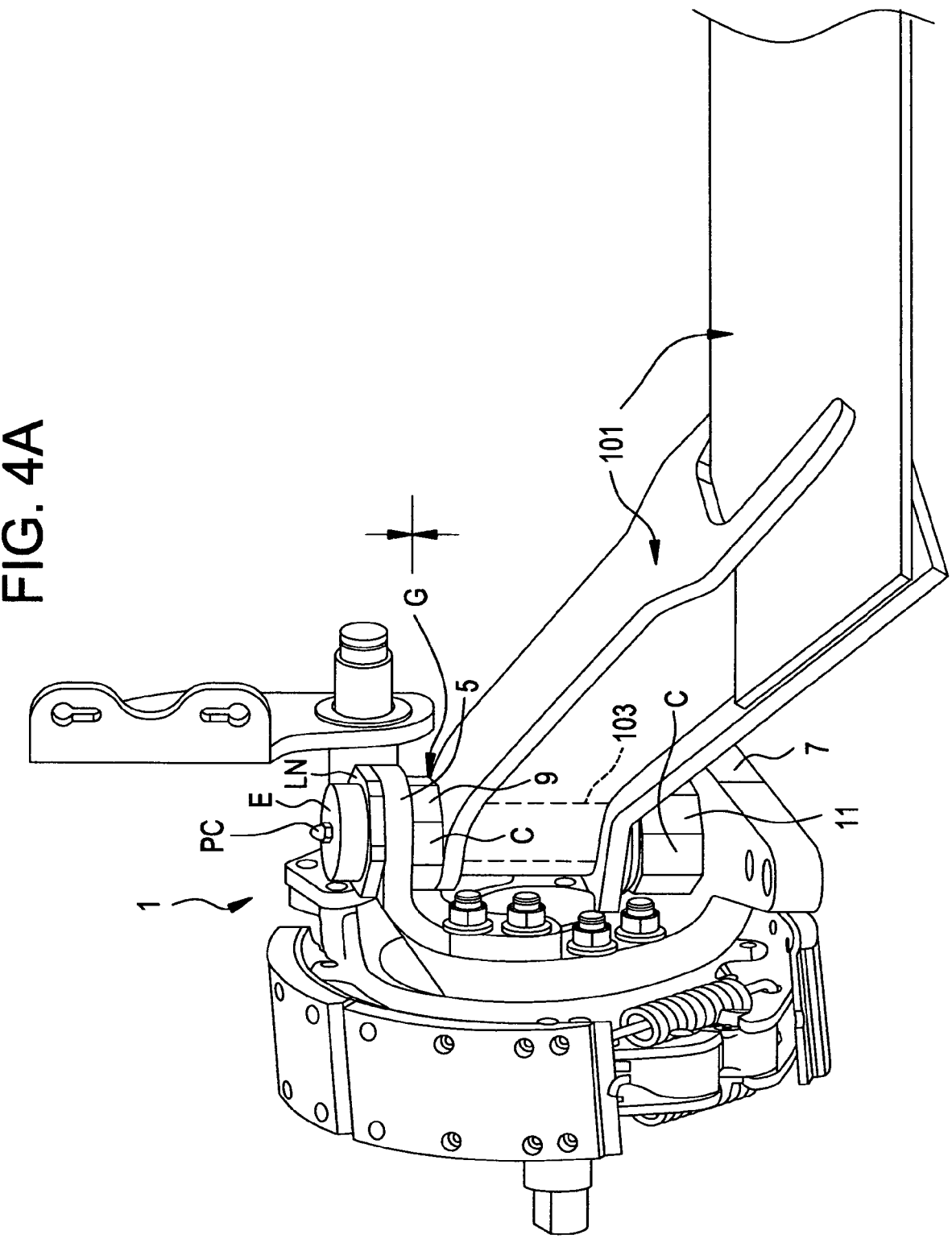
FIG. 4A is a three-dimensional view of one embodiment of the steering knuckle and steerable axle assembly according to the subject invention in which the undesirable gap "G" has been substantially eliminated by adjustment of one or more bosses in accordance with this invention.
Figure 5:
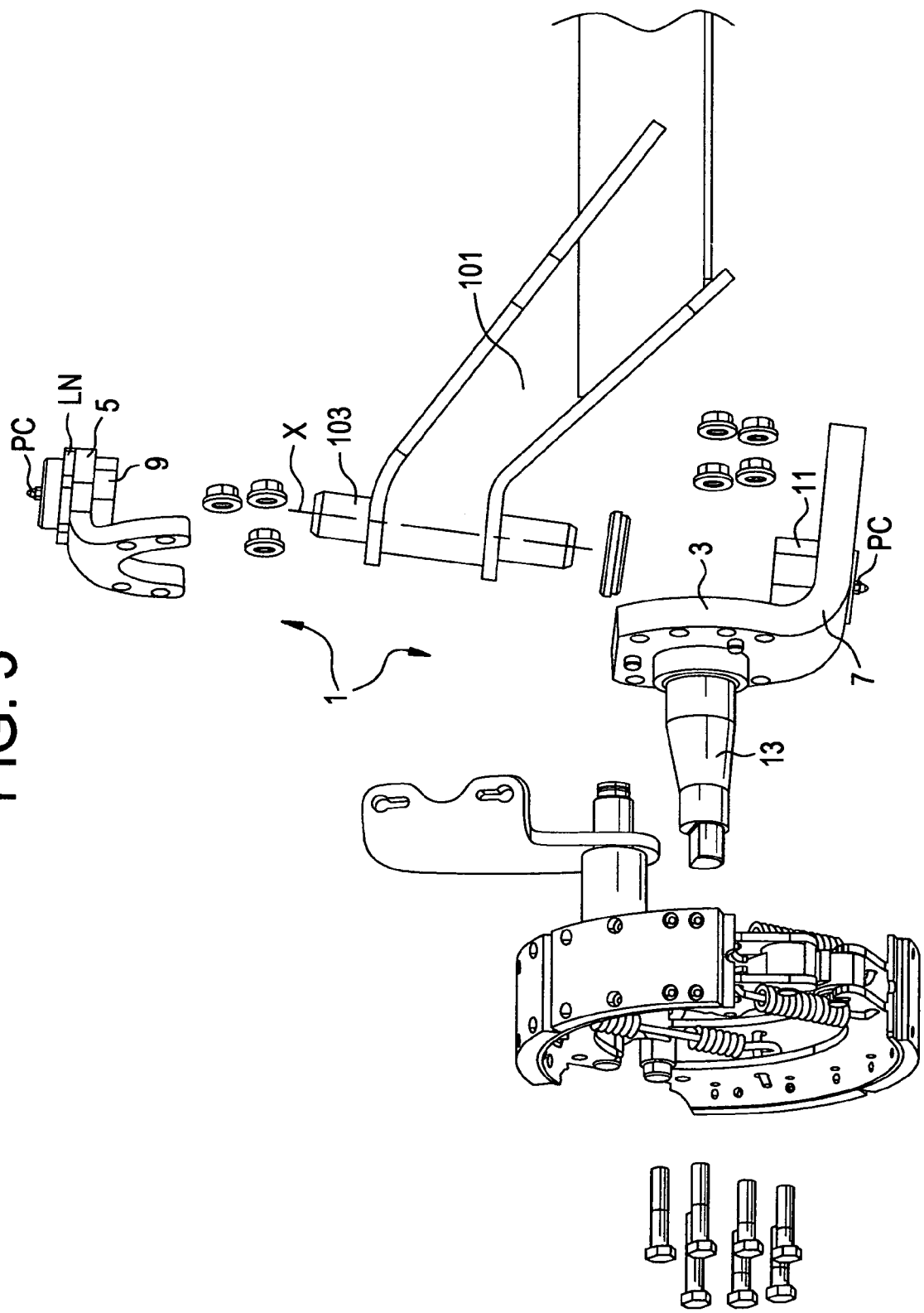
FIG. 5 is a three-dimensional exploded view of the embodiment illustrated in FIG. 4A.

Turning now to FIGS. 4a-4c, an example environment in which steering knuckle 1 finds utility is illustrated therein. As illustrated, steering knuckle 1 is assembled to a steerable axle 101 (e.g., an I-beam or fabricated-type axle) having kingpin 103 (illustrated in X-ray view with dotted lines) press-fit therein. As can be seen, assembled as such, steering knuckle 1 is retained on the axle by kingpin 103, the ends of which are engaged by apertures 10 and 12 (see FIGS. 3 and 6A) of bosses (or kingpin housings) 9 and 11, respectively (it is noted that the term "kingpin housing" is used periodically herein interchangeably with the term "boss"). Assembled as illustrated, steering knuckle 1 is free to pivot about the longitudinal axis "X" (see FIG. 5) of kingpin 103 thereby permitting so-called steerability.

As described in the BACKGROUND section above, one or more problems exist in the prior art which relate to the durability or longevity of steering knuckle parts as a result of imprecise fit and/or which relate to the prior art methods of installing such steering knuckles. Attention is thus now directed to FIG. 4b which best illustrates the fit problem of the prior art as at least one of the problems which the instant invention addresses, solves, or ameliorates.

Specifically, FIG. 4b illustrates a close-up view of the "fit" relationship between boss 9 and kingpin 103 when steering knuckle 1 is installed thereon and boss 9 has not yet been adjusted to eliminate detrimental or otherwise undesired gaps (e.g., between the boss and the surface of the axle surrounding the kingpin). More particularly, FIG. 4b illustrates a gap "G" which is typically present when a prior art steering knuckle is installed on a conventional steerable axle (and which was formerly eliminated by the addition of prior art shims). As aforesaid, the presence of gap "G" is undesirable and results in poor vehicle performance as well as increased wear rates of the steering knuckle and kingpin. For these reasons, it is desirable to eliminate, to a substantial or nearly complete extent gap "G" so that, in the preferred embodiments, an operative "non-gap" exists between boss 9 and axle 101 prior to the axle being installed on a vehicle. In this regard, a particularly efficacious embodiment of the inventive steering knuckle in which the substantial elimination of gap "G" has been effected (without employing prior art apparatus or methods), is illustrated in FIGS. 4a and 4c.

Firstly however, it is noted that the term "substantially" (e.g., when used in conjunction with terms describing the elimination of "gap" is used herein to allow a minor gap "G" to remain between the axle and the boss on the order of preferably no more than 1.5 millimeters, for example. However, in the most preferred embodiments, the axle and boss are in contact (or nearly so) such that gap "G", for all intents and purposes, may be said to be virtually zero or non-existent.

As described above, in typical prior art practice, this essential "non-gap" type fit of the bosses to the axle was only achieved through precise manufacturing standards and/or a careful, time consuming part matching process, or through other measures such as the addition of shims on the kingpin to eliminate the above-mentioned gaps.

In contrast, and as an improvement over prior art apparatus and installation methods, in at least one embodiment of the invention, in order to permit the reduction or elimination of gap "G", one or both of bosses 9 and/or 11 is/are adjustably connected (e.g., as by screw threaded connection) to upper and lower yoke arms 5 and 7, respectively, where they extend substantially vertically therefrom (the term "vertically" being defined broadly as employed herein so as to merely indicate a general orientation as would be encountered in conventional steering knuckle design and as not referring to a specific angular limitation). More particularly, as may be seen in FIG. 3, at least one, and preferably each, yoke arm 5 and 7 is provided with a threaded aperture "TA1" and "TA2" and thus preferably each boss 9 and 11 includes, along at least a portion of its outer circumference, threads "T" for threadably mating with correspondingly threaded apertures "TA1" and "TA2". Specifically, threads "T" are provided so that at least one or each boss 9 and 11 can be attached to its respective yoke arm (5 or 7) in a selectively, preferably continuously, adjustable manner. More specifically, during the final stages of assembling steering knuckle 1 on a "kingpinned" axle (or at any other desirable time such as axle disassembly for example), either or both of bosses 9 and 11 may be threaded into or out of threaded aperture "TA1" or "TA2" (by clockwise or counter clockwise rotation) in order to select a distance which collar "C" of the bosses will extend from the yoke arms, respectively, thereby selecting the distance between boss 9 (and/or 11) and axle 101 (i.e., gap "G"). This selected distance is adjusted as appropriate, as such, to achieve the correct fit of steering knuckle 1 on kingpin 103 of the axle such as illustrated in FIG. 4c. In this respect, it will be understood by those skilled in the art that the "fit" should not be so tight as to create a form of inoperativeness in the system by not allowing appropriate articulation of the parts as utilized for steerability in the operation of the vehicle (e.g., a minimal functional "gap" or "non-gap" is preferably maintained). In this regard, gaps which are substantially greater in size than the value of a gap or gaps useful for allowing knuckle articulation about the kingpin are hereby referred to as "non-functional". In this regard, the numerical value or size of gap "G" (or the numerical value or size of the sum of the top and bottom gaps) which exceeds that useful for knuckle articulation serves no desired function and should therefore be minimized or eliminated where possible (e.g., in order to optimize wear characteristics).

As noted above, it is desirable to leave a very minimal distance between the bosses and the axle after adjustment so that friction is not so great as to induce excessive frictional resistance between bosses 9 and/or 11 and axle 101. An example of such a minimal distance can range from essentially a zero gap to 1.5 millimeters with a more preferred numerical range being selected from between 0.0005-0.005 millimeters (e.g., herein referred to as the "substantial elimination" of the gap or, synonymously, that the gap has been "substantially eliminated"), thereby to achieve the purposes of this invention. This, of course, as aforesaid, prevents or reduces the amount of axial oscillation of kingpin 103 within boss apertures 10 and 12 during vehicle operation and therefore reduces stress on the kingpin, the axle, and the steering knuckle. It, furthermore, decreases the amount of debris which is vacuumed into the boss apertures thereby lessening kingpin and bushing wear.

Although the description above refers to gaps existing proximal either the upper or lower boss 9 or 11 as if they are static, in reality, the presence of gaps at the boss kingpin connection areas may be transitional (e.g., the gaps may fluctuate in magnitude as the vehicle is operated). For example, during operation of a vehicle employing a steering knuckle, as the vehicle passes over uneven road surfaces, movement of the knuckle with respect to the kingpin occurs. As a result, small gaps open and close between the area of the axle surrounding the kingpin and the boss collar surfaces. Thus, because of the temporary or fluctuating nature of these gaps, they are herein referred to as transitional, e.g., they enlarge or shrink or come and go with vehicle movement. Moreover, because of the sometimes transitional nature of the subject gaps, in some cases, it is more appropriate to discuss the numerical sizes of the gaps as a "sum" of the gaps in the interest of clarity. In this regard, the term "sum" as herein used refers to the result of the numerical addition of the value of the gap at the upper boss-kingpin connection to the value of the gap at the lower boss-kingpin connection. In one example embodiment, in this regard, a desired sum gap value is selected from between approximately 0-1.5 millimeters. Other sum gap values of greater or lesser numerical value are, of course, contemplated (the principal objective being to optimize the sum gap value so that axle/knuckle wear is minimized while simultaneously permitting the rotational articulation necessary for steerability.

Referring now to FIGS. 6a-c, an exemplar embodiment of boss 9 is illustrated in greater detail. Boss 11, it should be understood, is a substantial duplicate thereof in the embodiments herein as noted by the "(11)" in the figures.

Because in conventional steering knuckle design, it is desirable to provide a lubricant (e.g., grease) to the housed portion of the kingpin as well as to the bearing/bushing surfaces (within boss apertures 10 or 12) bosses 9 and 11 include a fill port "FP" (e.g., a small threaded aperture) through which grease or other lubricant may be added. Using a lubricant, such as grease, reduces friction between parts thus reducing wear and aiding in the free rotation of the boss about the kingpin (and thus the free rotation of the steering knuckle about the kingpin) which allows the axle to be steerable. As may be seen in FIG. 6b, fill port "FP" extends such that it connects to aperture 10 or 12, respectively, thus allowing lubricant to substantially fully coat the respective ends of kingpin 103 when it is installed therein (i.e., within both bosses apertures). In some embodiments, port caps "PC" (see FIG. 3) are employed with bosses 9 and 11, respectively, and are used to seal fill ports "FP" (e.g., they simply thread into their respective port after lubricant has been added). In further, preferred embodiments, port caps "PC" optionally employ a conventional o-ring (not shown for convenience) to facilitate a weather and leak-proof seal.

Although in the illustrated embodiments bosses 9 and 11 are substantially identical in structure, in alternative embodiments, one or both of bosses 9 and 11 may differ from the structure disclosed in these figures so long as at least one boss is adjustable during installation relative to its respective yoke arm. For example, boss 11 may be permanently fixed to yoke arm 7 without departing from the spirit and scope of the subject invention.

In still further embodiments, a bushing B (See FIG. 6B) may be installed within apertures 10 and/or 12 prior to the installation of steering knuckle 1 on kingpin 103. Such a bushing provides increased wear resistance characteristics as well as reduces frictional resistance between the bosses and the kingpin (i.e., during rotation or articulation of the knuckle). It has been discovered, however, that if bosses 9 and 11 are constructed, in whole or in part, of a nickel-aluminum bronze alloy (an example of which is Material No. A023 manufactured by PIAD Corp. in Greensburg, Pa.), bushing B is not required. FIGS. 6A-6C thus merely show this bushing B as an optional element. Specifically, such nickel-aluminum bronze alloys have proven to be particularly durable while simultaneously providing a low-friction contact surface fully operative and suitable as a bushing/bearing material. In this regard, if the aperture of a steering knuckle boss is constructed of a nickel-aluminum bronze alloy (or the entire boss is constructed of such material) then the rather cumbersome step and additional cost of sizing and installing an independent bushing, such as bushing B, becomes unnecessary. As will be appreciated by those skilled in the art, by the elimination of the need for an independent bushing B, a significant improvement (e.g., reduction) in the scheduling of maintenance, etc., is achieved, because it was often the case in the prior art that king pin bushings would frequently wear out, requiring significant down time for their replacement, or at least a heightened frequency of maintenance checks to determine their degree of wear. Furthermore, by not utilizing bushing B, no machining to replace the bushing is required when worn. Rather, if the boss wears out, it simply is replaced.

Figure 8:
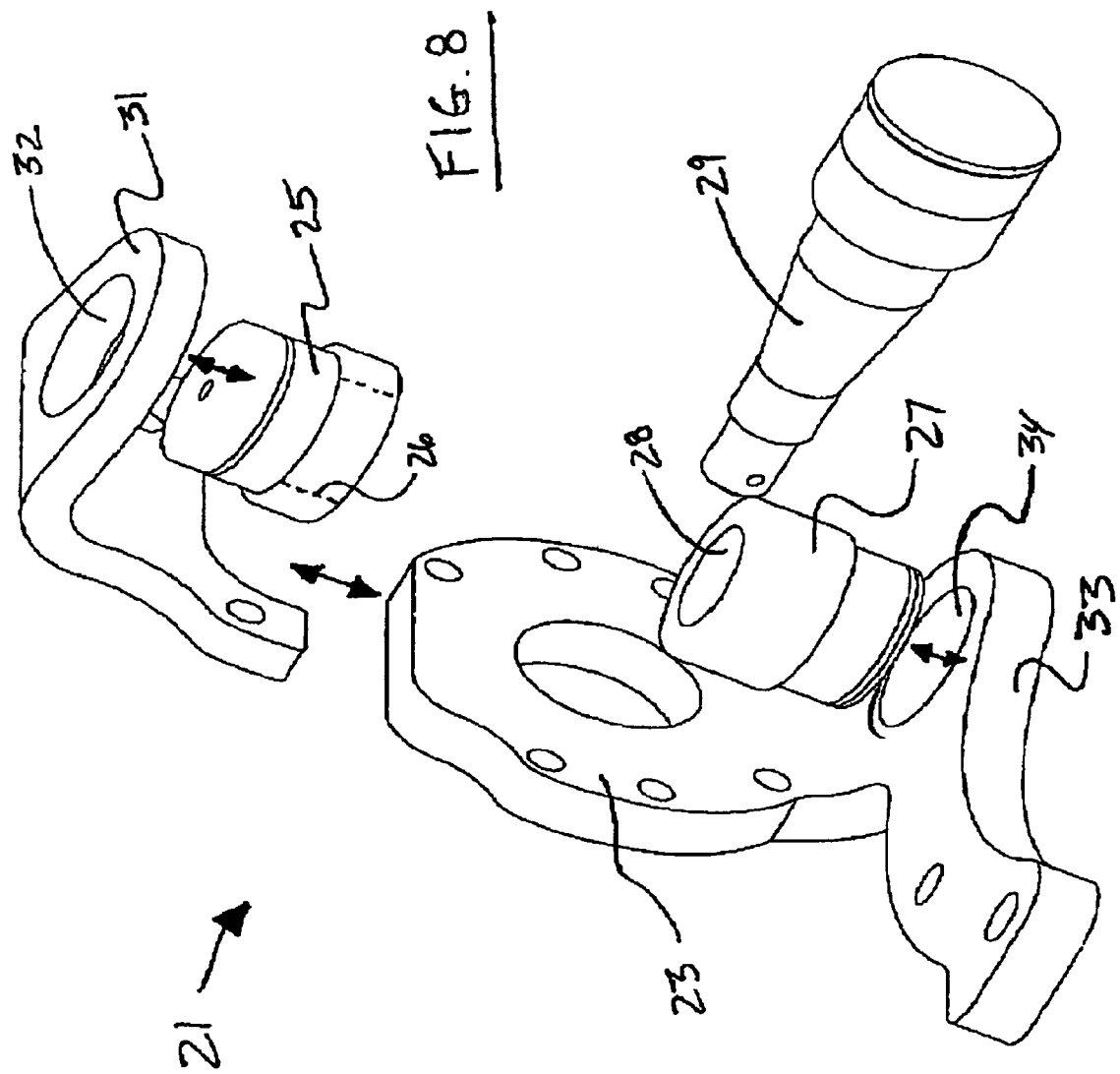
FIG. 8 is an exploded view of the embodiment of the steering knuckle illustrated in FIG. 7.
Figure 9:
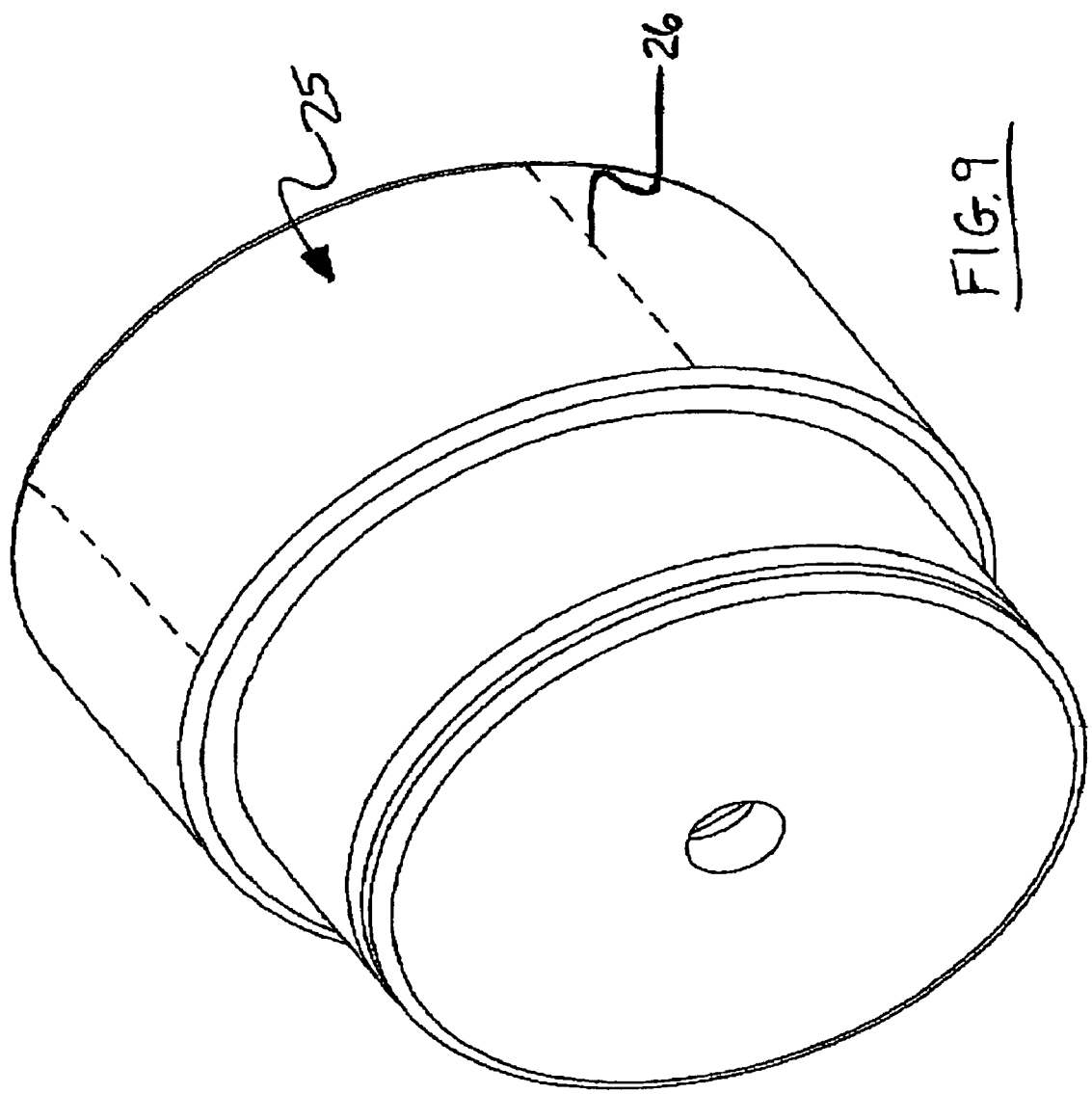
FIG. 9 is a three-dimensional, partial x-ray view of a boss useful in the embodiment of the steering knuckle illustrated in FIG. 7.
Figure 10:
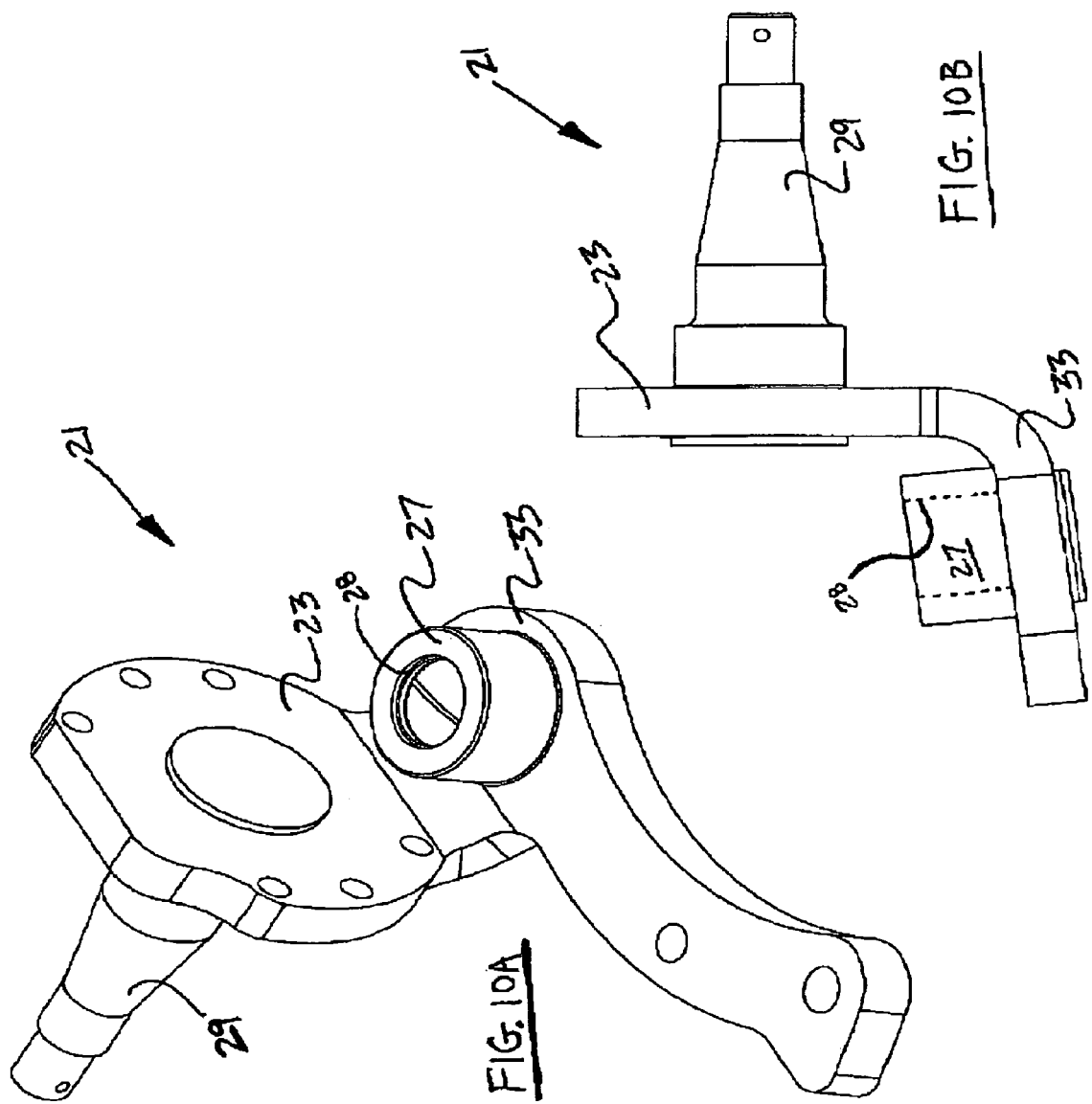
FIG. 10A is a three-dimensional view of the steering knuckle illustrated in FIG. 7 shown with the upper yoke arm removed.
FIG. 10B is a profile plan view of the steering knuckle portion illustrated in FIG. 10A.

Turning now to FIGS. 7-8, an alternative embodiment of steering knuckle 1 is depicted therein. Regarding this embodiment, it is noted that the above uses and definitions of the various terminologies as they relate to gap sizes and the minimization or elimination thereof, are equally applicable to the following embodiment.

In at least one example of this alternative embodiment, rather than attaching bosses (or kingpin housings) 25 and 27 to their respective yoke arms via threaded connections (the surfaces of yoke apertures 32 and 34 are non-threaded), one or more of the bosses is attached (to its yoke arm) by so-called "interference fit" techniques by press fitting the boss into its respective aperture (i.e., to a depth in the yoke aperture/or axial location in the aperture such as to substantially or completely eliminate the above-described non-functional gaps). In particular, because of the mechanical characteristics of interference or press fit-type connections, the boss or bosses are retained in their respective yoke arms more securely than if attached by screw thread connection, e.g., the result is, in effect, a permanent connection. As a benefit of this embodiment then, the positional locations of bosses 25 and 27 are more tamper resistant and/or are less likely to inadvertently affected or altered during normal axle use or installation, for example. Using such press or interference fit-type connections, then, the minimization or substantial or complete elimination of non-functional gaps "G" may be achieved in a manner which is analogous in result to the embodiments and methods previously described above (e.g., such reduction in gaps synonymously referring to the maintenance of a useful "non-gap" as defined above).

EXAMPLE METHOD OF INSTALLATION

Figure 11:
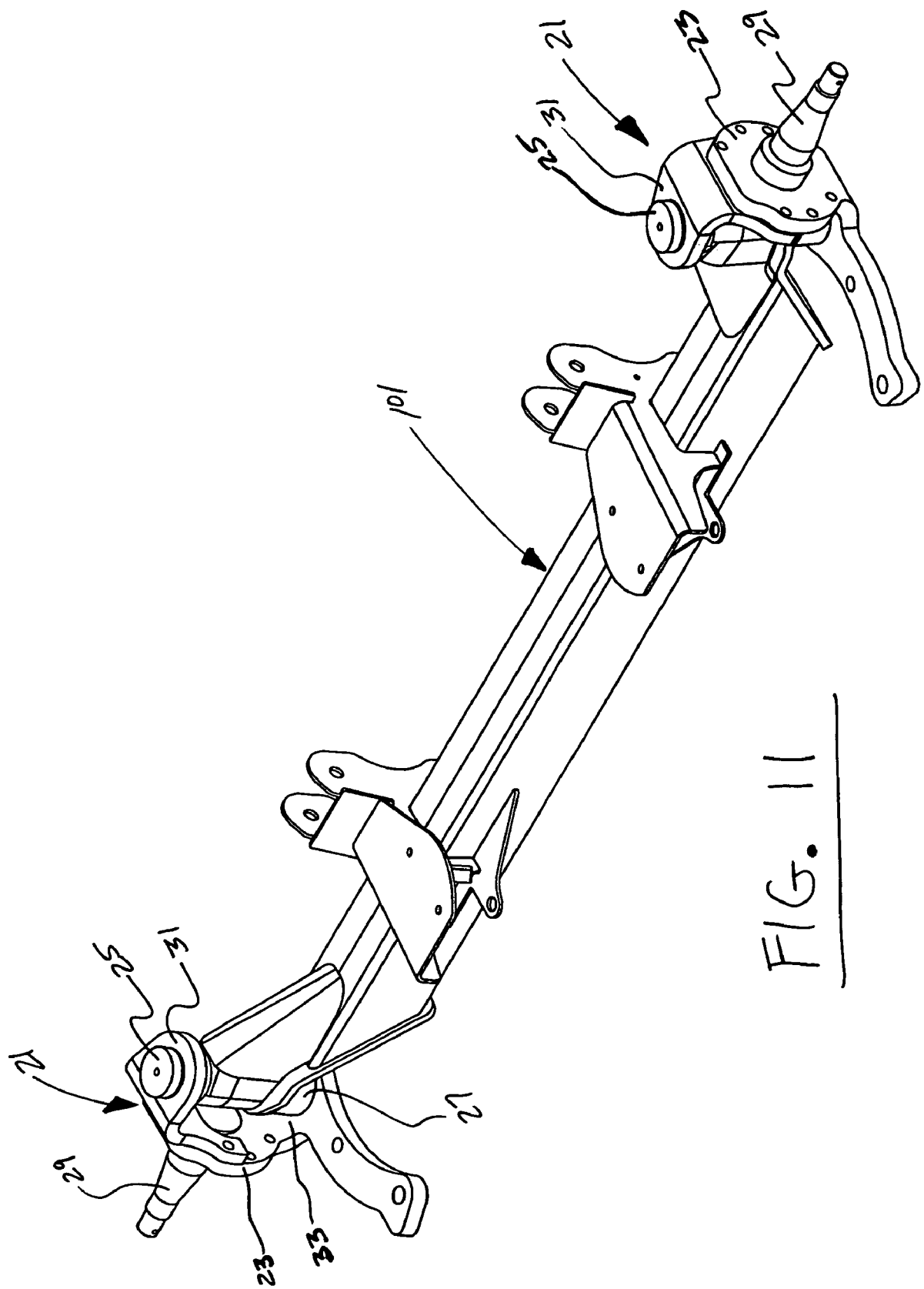
FIG. 11 is a three-dimensional view of one embodiment of the steering knuckle and steerable axle assembly according to the subject invention in which the undesirable gap "G" has been substantially eliminated by adjustment of one or more bosses in accordance with an embodiment of this invention.
Figure 12:
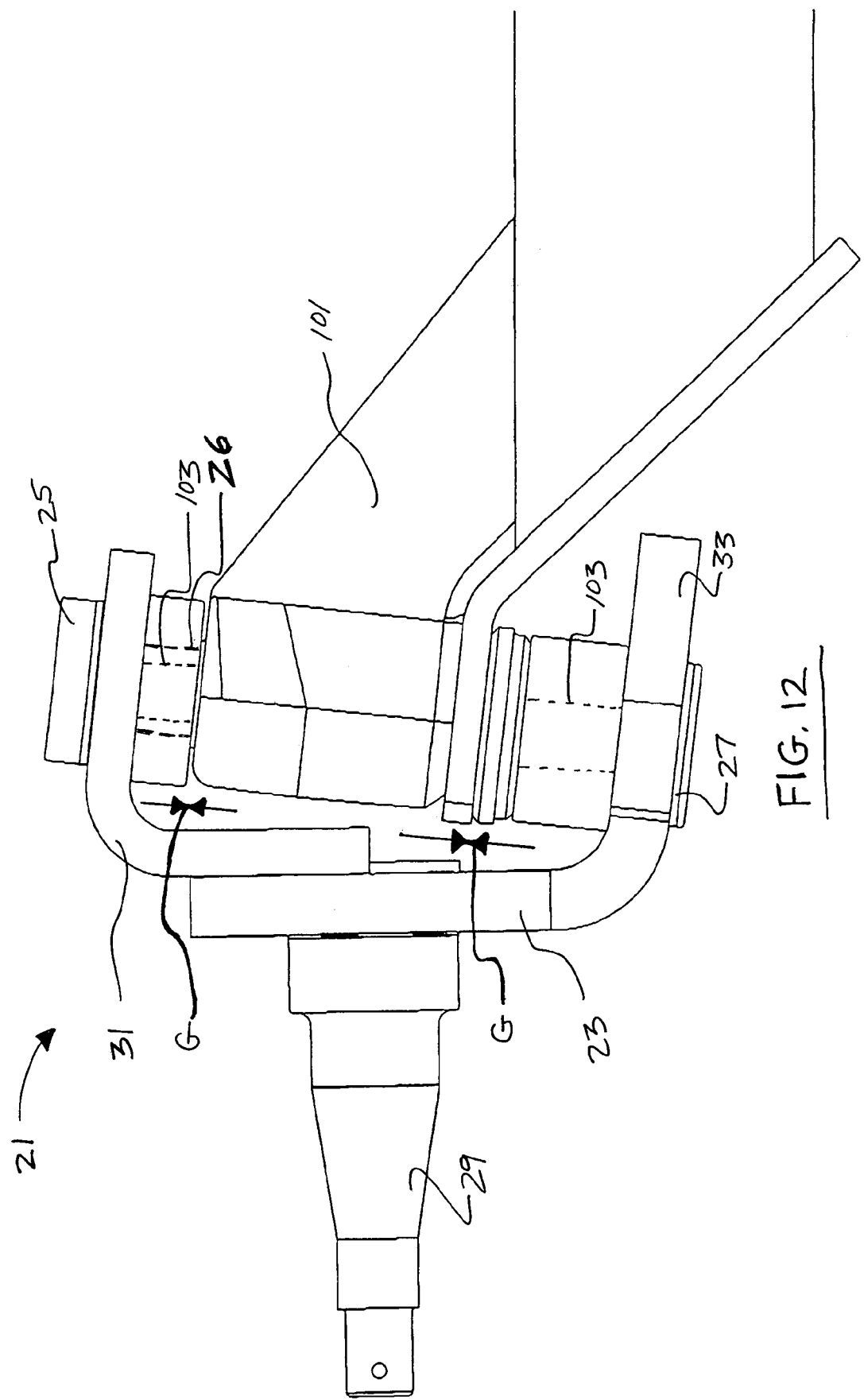
FIG. 12 is a partial, profile view of a steering knuckle and axle end depicted in FIG. 11 illustrating more fully the substantial elimination of gap "G".
Figure 13:
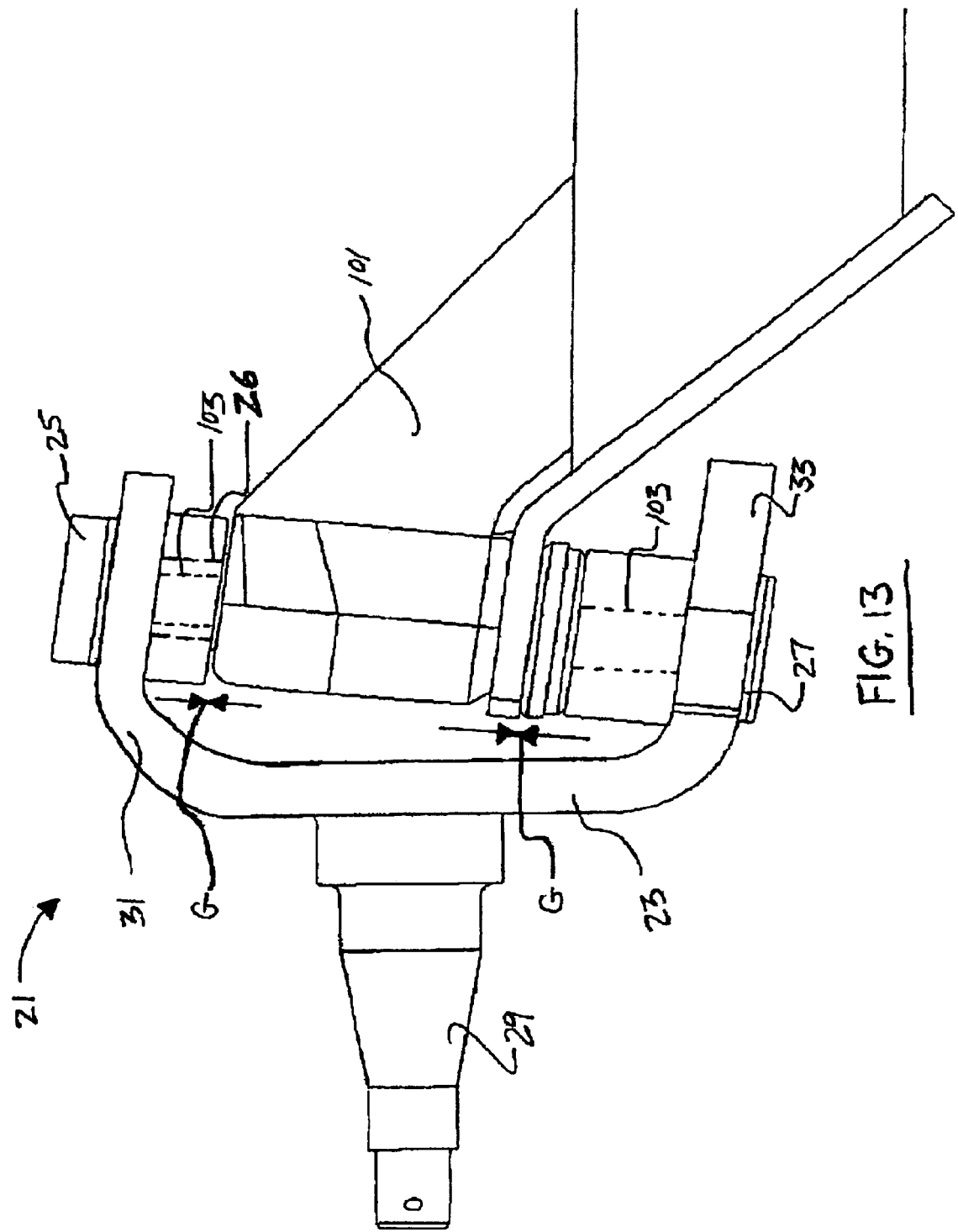
FIG. 13 is a partial, profile view of an alternative embodiment of the steering knuckle and axle end illustrated in FIG. 12.

In concurrence with describing an example method of installing steering knuckle 21 to an axle, attention is now directed to FIGS. 11 and 12, in which a king-pinned axle 101 of known type is illustrated. As the first step of installation in this example, lower yoke arm 33 is positioned in proximity to kingpin 103 so that aperture 28 of lower boss 27 encompasses a first (e.g., lower) end of the kingpin. Next, detachable upper yoke arm 31 is manipulated so that aperture 26 (shown in x-ray) of upper boss 25 receives a second end of kingpin 103. Once positioned as such, upper boss 25 is press fit into aperture 26 so that the boss is immovably secured thereto and so that non-functional gaps between the bosses and axle 101 are substantially or completely eliminated (e.g., gap "G" is minimized or eliminated). In this regard, once press fit, the attachment of upper boss 25 to upper yoke arm 31 is, in effect, permanent and its axial position within aperture 26 (its mount depth within the aperture) is likewise fixed. As a result, once a desired positioning of the boss has been achieved to remove the desired amount of gap between the axle and the boss, there is limited opportunity for tampering (intentional or unintentional) with the installation by subsequent personnel and/or a reduced possibility of advertent corruption of the "fit" of the knuckle to the axle.

In at least one embodiment of the invention, lower boss 27 is pre-installed in lower yoke arm 33 (in aperture 34). In this regard, lower boss 27 can be pre-press fit in a manner similar to boss 25, or, alternatively, the boss can be an integral unit (e.g., a part machined from the same stock material as yoke arm 33). In other embodiments, lower boss 27 is press fit into lower yoke arm 33 during the installation of steering knuckle 21 on an axle in an analogous manner to upper boss 25 with an objective to substantially eliminate non-gaps between the bosses and the axle.

In the same manner that the yoke arms and bosses may have alternative configurations or constructions in different embodiments, spindle 29 can be a fabricated part or can be machined as a piece integral to knuckle body 23. In the illustrated embodiment, spindle 29 is press fit into a central aperture in knuckle body 23 (either prior to or after installation of the knuckle onto an axle).

Similarly, in at least one embodiment of the invention, at least one yoke arm (e.g., yoke arm 31 and/or 33) is constructed so as to be removable from body structure 23 and, in this respect, may be a fabricated part which, in addition to providing ease of kingpin/axle installation, simplifies the manufacture of the knuckle as well as in some cases reduces its manufacturing cost. Nevertheless, in at least one embodiment, it is preferred that the lower yoke arm (e.g., yoke arm 33) be constructed integral to body structure 23 (each part being machined or formed from an single stock material) principally because such a configuration exhibits greater strength and durability characteristics (e.g., the lower yoke arm bears the majority of the vehicle load during typical operation).

Although, in the subject method, the installation of bosses 25 and 27 is, for all intents and purposes, permanent, nevertheless, if removal of knuckle 21 from axle 101 is required or desired, removal is, of course, possible (e.g., in order to effect knuckle repair or replacement). Alternatively, in embodiments employing removable yoke arms (e.g., one or more of the yoke arms being connected to the knuckle body via removable mechanical means such as bolts), an entire yoke arm (or both) can be removed for de-installation of the knuckle.

Regarding the terminology employed in describing the method detailed above, a boss (or the bosses) is/are described as being "immovably" press fit (attached) to a yoke arm. For the purposes of interpreting the disclosure of the subject invention, being attached "immovably" is hereby defined as being attached in a manner such that the boss will not alter position (e.g., at least not to an extent greater than within minimal tolerance levels) when subjected to substantially normal vehicle/axle operational forces. More specifically, although otherwise described as immovably connected, it is acknowledged that if an appropriate force is applied, nearly any object, regardless of size or means of attachment, can be moved with respect to another. Thus, the so-called "immovable" connection of the boss as described herein is refers simply to a connection which, during typical vehicle operation and under normal vehicle loads, prevents undesired axial displacement of the boss relative to its yoke arm (i.e., within the installation aperture 32 or 34 in the yoke arm) during knuckle installation and during vehicle operation.

Finally, it is noted that apart from the connection mechanisms for connecting bosses 25 and 27 to their respective yoke arms (e.g., via interference fit rather than by screw thread connection), such bosses may be similar or identical in structure to bosses 9 and 11 as described herein above. Other boss configurations are, of course, useful and contemplated.

Once given the above disclosure, many other features, modifications, and improvements will become apparent to the skilled artisan. Such other features, modifications, and improvements are therefore considered to be part of this invention, the scope of which is to be determined by the following claims:

I claim:

1. A method of assembling a steering knuckle to a steerable axle, said steerable axle having an axle beam and a kingpin mounted in an end thereof, said method comprising:

assembling a lower yoke arm of a steering knuckle to a first end of said kingpin so that a lower kingpin housing connected to said lower yoke arm is in receipt of at least a portion of said first end of said kingpin;

assembling an upper yoke arm of said steering knuckle to a second end of said kingpin so that an upper kingpin housing associated with said upper yoke arm is in receipt of at least a portion of said second end of said kingpin; and press fitting said upper kingpin housing into an aperture of said upper yoke arm so that said upper kingpin housing is immovably connected to said upper yoke arm and so that non-functional gaps between said upper kingpin housing and an area of said axle beam surrounding said second end of said kingpin are substantially eliminated.

2. A method according to claim 1 wherein said upper kingpin housing is press fit into a position in said upper yoke arm so that during vehicle operation, substantial oscillation of said kingpin in and out of said upper and lower kingpin housings is prevented.

3. A method according to claim 2 further including the method step of press fitting said lower kingpin housing into an aperture of said lower yoke arm so that said lower kingpin housing is immovably connected to said lower yoke arm.

4. A method according to claim 3 wherein said upper yoke arm and said lower yoke arm are integrally formed with a knuckle body having a spindle.

5. A method according to claim 4 further including a method step of press fitting said spindle into said knuckle body.

6. A method according to claim 2 wherein said lower yoke arm is integrally formed with a knuckle body having an aperture for a spindle; and wherein said upper yoke arm is attachable and detachable from said knuckle body via mechanical connection.

7. A method according to claim 6 further including a method step of press fitting a spindle into said aperture of said knuckle body.

8. A method according to claim 6 further including a method step of determining an optimum press fit depth of said upper kingpin housing in an aperture of said upper yoke arm, said optimum press fit depth corresponding to a location of said upper kingpin housing within said aperture of said upper yoke arm at which non-functional gaps between said upper kingpin housing and an area of said axle beam surrounding said second end of said kingpin are substantially eliminated thereby reducing wear to the steering knuckle and steerable axle.

9. A method according to claim 8 wherein said method step of assembling said upper yoke arm of said steering knuckle to said second end of said kingpin further comprises:

after assembling said lower kingpin housing to said first end of said kingpin, orienting said upper kingpin housing such that an aperture of said upper kingpin housing is in substantial alignment with said second end of said kingpin;

mechanically, rigidly connecting said upper yoke arm to said knuckle body; and press fitting said upper kingpin housing into said upper yoke arm so that said aperture of said upper kingpin housing is in receipt of at least a portion of said second end of said kingpin and such that said upper kingpin housing is immovably connected to said upper yoke arm via interference fit.

10. A method according to claim 9 wherein prior to press fitting said upper kingpin housing into said upper yoke arm, said upper kingpin housing is movably installed in an aperture of said upper yoke arm.

11. A method according to claim 9 wherein in said step of mechanically, rigidly connecting said upper yoke arm to said knuckle body, said upper yoke arm is bolted to said knuckle body.

12. A method according to claim 9 wherein when said steering knuckle is installed on said steerable axle and said steerable axle is installed on a vehicle, during vehicle operation, an upper functional space transitionally exists between said upper kingpin housing and said area of said axle beam surrounding said second end of said kingpin and a lower functional space transitionally exists between said lower kingpin housing and said area of said axle beam surrounding said first end of said kingpin; and wherein the sum value of said upper functional space and said lower functional space is selected from with a range of between approximately 0-1.5 millimeters.

13. A method according to claim 12 wherein said sum value of said functional spaces is equal to or less than approximately 1.5 millimeters.

14. A method according to claim 9 further including the method step of press fitting said lower kingpin housing into said lower yoke arm so that said lower kingpin housing is immovably connected to said lower yoke arm.

15. Apparatus comprising:

a steerable axle having an axle beam, said axle beam having a top surface and a bottom surface, a kingpin mounted in an end of said axle beam such that a first end of said kingpin extends generally upwardly from said top surface of said axle and such that a second end of said kingpin extends generally downwardly from said bottom surface of said axle; and a steering knuckle steerably connected to said steerable axle, said steering knuckle comprising:

a first yoke arm having a first boss associated therewith, said first boss having an aperture in receipt of said first end of said kingpin;

a second yoke arm having a second boss associated therewith, said second boss having an aperture in receipt of said second end of said kingpin;

a knuckle body to which said first and said second yoke arms are connected, said knuckle body having a spindle extending outwardly therefrom for carrying a vehicle wheel; and wherein at least one of said first boss and said second boss is press fit to a respective yoke arm such that non-functional gaps between said first boss and said top surface of said axle and between said second boss and said bottom surface of said axle are substantially eliminated.

16. Apparatus according to claim 15 in combination with a wheeled vehicle; wherein during vehicle operation a first functional space transitionally exists between said first boss and said area of said axle beam surrounding said first end of said kingpin and a second functional space transitionally exists between said second boss and said area of said axle beam surrounding said second end of said kingpin; and wherein the sum value of said first functional space and said second functional space is selected from with a range of between approximately 0-1.5 millimeters.

17. Apparatus according to claim 16 wherein said first yoke arm is integrally formed with said knuckle body; and wherein said second yoke arm is attachable and detachable from said knuckle body via mechanical connection.

18. Apparatus according to claim 17 wherein said mechanical connection comprises male and female threaded members being threadably engageable one to the other.

19. Apparatus according to claim 18 wherein said first and said second bosses include fill ports for receiving lubricant therein.

20. Apparatus according to claim 19 wherein said first and said second bosses have bearing surfaces comprising at least in part a nickel-aluminum bronze alloy.

21. Apparatus according to claim 20 wherein said first and said second bosses each include port caps for sealing said fill ports, said port caps comprising threaded cap members having o-rings to seal said fill ports.

22. Apparatus according to claim 16 wherein said first and said second yoke arms are integrally formed with said knuckle body.

23. Apparatus according to claim 17 or 22 wherein said spindle is press fit into said knuckle body.

24. A steerable axle, steering knuckle, and wheel combination for mounting on a heavy duty truck, the improvement comprising the steering knuckle according to claim 16.

25. A method of assembling a steering knuckle to a steerable axle, said steerable axle having an axle beam and a kingpin mounted in an end thereof, said method comprising:
    assembling a first boss of a first yoke arm to a first end of said kingpin;
    assembling a second boss of a second yoke arm to a second end of said kingpin at an initial location;
    axially adjusting the position of said second boss along a longitudinal axis of said kingpin from said initial location to a fixed location, said fixed location being selected so that substantial gaps between said first boss and an area of said axle beam surrounding said first end of said kingpin and between said second boss and an area of said axle beam surrounding said second end of said kingpin are substantially eliminated; said adjustment of the position of said second boss being performed in a method step wherein said second boss is press fit into an aperture of said second yoke arm so that said second boss is immovably installed in said aperture of said second yoke arm via interference fit.

26. A method according to claim 25 wherein said substantial elimination of substantial gaps is defined as a substantial elimination of non-functional gaps between said first boss and said area of said axle beam surrounding said first end of said kingpin and between said second boss and said area of said axle beam surrounding said second end of said kingpin.

27. A method according to claim 26 wherein said method step of assembling said upper yoke arm of said steering knuckle to said second end of said kingpin further comprises:
    after assembling said first boss to said first end of said kingpin, mechanically, rigidly connecting said second yoke arm to said knuckle body and orienting said second boss such that an aperture of said second boss is in substantial axial alignment with said second end of said kingpin; and
    press fitting said second boss into said second yoke arm so that said aperture of said second is in receipt of at least a portion of said second end of said kingpin and such that said second boss is immovably connected to said second yoke arm via interference fit.

28. A method according to claim 27 wherein prior to press fitting said second boss into said second yoke arm, said second boss is movably installed in an aperture of said second yoke arm.

29. A method according to claim 27 further including a method step of determining an optimum press fit depth of said second boss in an aperture of said second yoke arm, said optimum press fit depth corresponding to a location of said second boss within said aperture of said second yoke arm at which non-functional gaps between said second boss and an area of said axle beam surrounding said second end of said kingpin are substantially eliminated thereby reducing wear to the steering knuckle and steerable axle.

30. A method according to claim 25 wherein when said steering knuckle is installed on said steerable axle and said steerable axle is installed on a vehicle, during vehicle operation, a first functional space transitionally exists between said first boss and said area of said axle beam surrounding said first end of said kingpin and a second functional space transitionally exists between said second boss and said area of said axle beam surrounding said second end of said kingpin; and wherein the sum value of said first functional space and said second functional space is selected from with a range of between approximately 0-1.5 millimeters.

31. A method of assembling a steering knuckle to a steerable axle having a kingpin, said steering knuckle comprising:
    a knuckle body having a spindle extending therefrom for assembly of a wheel thereto;
    an upper yoke arm having a first boss associated therewith, said first boss including a first aperture for receiving a first end of said kingpin;
    a lower yoke arm having a second boss associated therewith, said second boss including a second aperture for receiving a second end of said kingpin;
    at least one of said upper and lower yoke arms and its respective boss associated therewith including matable friction fit connection surfaces for connecting said at least one yoke arm to its associated boss via interference fit, and further wherein said boss is immovably connectable to its said associated yoke arm in a plurality of axial positions selectable to tailor fit said boss to said kingpin of said steerable axle to prevent substantial movement of said kingpin axially within said first and said second apertures while simultaneously permitting rotational movement of said kingpin within said first and said second apertures;
    wherein said method comprises:
    assembling said upper yoke arm and said first boss on said kingpin of said steerable axle such that said first aperture of said first boss is in receipt of at least a portion of said first end of said kingpin;
    assembling said lower yoke arm and said second boss on said kingpin of said steerable axle such that said second aperture of said second boss is in receipt of at least a portion of said second end of said kingpin;
    press fitting at least one of said first boss or said second boss into a yoke aperture of said upper or said lower yoke arm so that any substantial non-functional gaps between said first boss and an area of said steerable axle surrounding said first end of said kingpin and between said second boss and an area of said steerable axle surrounding said second end of said kingpin are eliminated.

32. A method according to claim 31 further including installing said steerable axle on a vehicle.

33. A method according to claim 31 wherein said upper yoke arm is selectively connectable and disconnectable to said knuckle body, and wherein said method further includes a method step of connecting said upper yoke arm rigidly to said knuckle body.

34. A method according to claim 33 further including installing a wheel assembly on said spindle.

35. A method a according to claim 31 wherein when said steering knuckle is installed on said steerable axle and said steerable axle is installed on a vehicle, during vehicle operation, an first functional space transitionally exists between said first boss and said area of said steerable axle surrounding said first end of said kingpin and a second functional space transitionally exists between said second boss and said area of said steerable axle surrounding said second end of said kingpin; and wherein the sum value of said first functional space and said second functional space is selected from with a range of between approximately 0-1.5 millimeters.

* * * * *